(12) United States Patent
Sung et al.

(10) Patent No.: US 8,199,103 B2
(45) Date of Patent: Jun. 12, 2012

(54) SYSTEM AND METHOD OF CONTROLLING SWITCHING DISPLAY WHICH EMBODIES TRANSMITTING/TRANSFLECTIVE/REFLECTIVE MODE

(75) Inventors: Gee Young Sung, Daegu (KR); Du-Sik Park, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 824 days.

(21) Appl. No.: 12/103,898

(22) Filed: Apr. 16, 2008

(65) Prior Publication Data
US 2009/0096967 A1  Apr. 16, 2009

(30) Foreign Application Priority Data
Oct. 12, 2007 (KR) .................. 10-2007-0103197

(51) Int. Cl.
*G09G 3/36* (2006.01)

(52) U.S. Cl. .................. 345/107; 345/108; 349/114

(58) Field of Classification Search ............... 345/85, 345/86, 107, 108; 264/4.1, 4.3, 4.7; 359/296; 252/583, 584; 349/114
See application file for complete search history.

(56) References Cited

U.S. PATENT DOCUMENTS

| | | | | |
|---|---|---|---|---|
| 4,261,653 A * | 4/1981 | Goodrich | ............. | 359/296 |
| 5,708,525 A * | 1/1998 | Sheridon | ............. | 359/296 |
| 5,717,514 A * | 2/1998 | Sheridon | ............. | 359/296 |
| 5,717,515 A * | 2/1998 | Sheridon | ............. | 359/296 |
| 5,737,115 A * | 4/1998 | Mackinlay et al. | ......... | 359/296 |
| 5,739,801 A * | 4/1998 | Sheridon | ............. | 345/84 |
| 5,751,268 A * | 5/1998 | Sheridon | ............. | 345/107 |
| 5,760,761 A * | 6/1998 | Sheridon | ............. | 345/107 |
| 5,767,826 A * | 6/1998 | Sheridon et al. | ............. | 345/84 |
| 5,891,479 A * | 4/1999 | Sheridon | ............. | 425/8 |
| 5,892,497 A * | 4/1999 | Robertson | ............. | 345/107 |
| 5,919,409 A * | 7/1999 | Sheridon | ............. | 264/8 |
| 5,982,346 A * | 11/1999 | Sheridon et al. | ............. | 345/85 |
| 6,241,921 B1 * | 6/2001 | Jacobson et al. | ............. | 264/1.36 |
| 6,421,035 B1 * | 7/2002 | Sheridon et al. | ............. | 345/85 |
| 6,621,541 B1 * | 9/2003 | Choi | ............. | 349/113 |
| 6,947,205 B2 * | 9/2005 | Zhang et al. | ............. | 359/321 |
| 7,486,431 B2 * | 2/2009 | Rabinowitz | ............. | 359/296 |
| 2001/0009352 A1* | 7/2001 | Moore | ............. | 313/582 |
| 2003/0071780 A1* | 4/2003 | Vincent et al. | ............. | 345/107 |
| 2006/0012848 A1* | 1/2006 | Rabinowitz | ............. | 359/290 |
| 2006/0290651 A1* | 12/2006 | Verhaegh et al. | ............. | 345/107 |
| 2007/0159678 A1* | 7/2007 | Verhaegh et al. | ............. | 359/265 |
| 2007/0295973 A1* | 12/2007 | Jinbo et al. | ............. | 257/88 |

FOREIGN PATENT DOCUMENTS

| | | |
|---|---|---|
| JP | 2003-195364 | 7/2003 |
| KR | 2005-45816 | 5/2005 |
| KR | 2005-86555 | 8/2005 |
| KR | 2005-112878 | 12/2005 |
| WO | WO 2005029170 A1 * | 3/2005 |

* cited by examiner

*Primary Examiner* — Amare Mengistu
*Assistant Examiner* — Dmitriy Bolotin
(74) *Attorney, Agent, or Firm* — Staas & Halsey LLP

(57) ABSTRACT

A system and method of controlling a switching display is provided. The system for controlling a switching display which embodies a transmitting/transflective/reflective mode, the system including: a display mode setting unit to set a display mode of a switching display according to a condition of an external light; and a twist ball control unit to control an electric signal of a transparent electrode of the switching display according to the set display mode, and to control a plurality of twist balls included in the switching display.

15 Claims, 7 Drawing Sheets

SYSTEM AND METHOD OF CONTROLLING SWITCHING DISPLAY WHICH EMBODIES TRANSMITTING/TRANSFLECTIVE/REFLECTIVE MODE

CROSS-REFERENCE TO RELATED APPLICATION

This application claims the benefit of Korean Patent Application No. 2007-103197, filed in the Korean Intellectual Property Office on Oct. 12, 2007, the disclosure of which is incorporated herein by reference.

BACKGROUND OF THE INVENTION

1. Field of the Invention

Aspects of the present invention relate to a system and method of controlling a switching display which embodies a transmitting/transflective/reflective mode, and more particularly, to a system and method of controlling a switching display embodying a transmitting/transflective/reflective mode which controls a twist ball included in the switching display and controls a transmission of a backlight and a reflection of an external light.

2. Description of the Related Art

In a conventional art, a liquid crystal display (LCD) panel provides a high quality image at indoors. Particularly, in a transmissive LCD panel including a backlight, a text and an image can be distinguished due to a bright screen and a high contrast. However, an object displayed on a transmissive LCD panel can not be easily distinguished outdoors due to a low contrast.

To overcome the above-described disadvantage, a transflective LCD panel using an external light and a transmitted light of a backlight has been developed. A transflective LCD panel simultaneously uses a reflected light where an external light is reflected and a transmitted light emitted through a backlight, and thereby can provide a high contrast even when an external light is bright.

However, since a transflective LCD panel uses a reflector installed in a pixel, an aperture of pixel is low. Specifically, it is disadvantageous in that a transflective LCD panel displays a darker image than a transmitting LCD panel in a low light environment due to a low aperture.

Thus, an apparatus or method which can provide a high contrast in any condition is needed to overcome the above-described disadvantages.

SUMMARY OF THE INVENTION

Aspects of the present invention provide a system and method of controlling a switching display which embodies a transmitting/transflective/reflective mode.

Aspects of the present invention also provides a system and method of controlling a switching display which converts a switching display mode using a twist ball, and thereby can regularly maintain a high contrast of a liquid crystal display (LCD) panel regardless of an intensity of external light.

Aspects of the present invention also provides a system and method of controlling a switching display which controls an electrical signal of a transparent electrode according to a switching display mode which is set according to a condition of external light, and thereby can rotate a twist ball.

Aspects of the present invention also provides a system and method of controlling a switching display which converts a display mode of a switching display using a twist ball including a transparent material which transmits a visible light and a twist ball which reflects a visible light.

According to an aspect of the present invention, there is provided a system for controlling a switching display which embodies a transmitting/transflective/reflective mode, the system including: a display mode setting unit to set a display mode of a switching display according to a condition of an external light; and a twist ball control unit to control an electric signal of a transparent electrode of the switching display according to the set display mode, and to control a plurality of twist balls included in the switching display.

The switching display controls a transmission of a backlight and a reflection of the external light according to the set display mode using the plurality of twist balls.

The display mode setting unit sets the switching display as any one display mode of the transmitting mode, transflective mode, and reflective mode according to the condition of the external light.

When the display mode of the switching display is set as the reflective mode, the twist ball control unit controls the electric signal of the transparent electrode to enable a surface of a reflector to be parallel to a surface of the transparent electrode, the reflector being included in the twist ball.

When the display mode of the switching display is set as the transmitting mode, the twist ball control unit controls the electric signal of the transparent electrode to enable a surface of a reflector to be perpendicular to a surface of the transparent electrode, the reflector being included in the twist ball.

When the display mode of the switching display is set as the transflective mode, the twist ball control unit controls the electric signal of the transparent electrode to enable a surface of a reflector and a surface of the transparent electrode to be arranged with an arbitrary angle, the reflector being included in the twist ball.

According to another aspect of the present invention, there is provided a method of controlling a switching display which embodies a transmitting/transflective/reflective mode, the method including: setting a display mode of a switching display according to a condition of an external light; controlling an electric signal of a transparent electrode of the switching display according to the set display mode; and controlling a plurality of twist balls included in the switching display through the controlled electric signal of the transparent electrode.

The setting sets the switching display as any one display mode of the transmitting mode, transflective mode, and reflective mode according to the condition of the external light.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Figure 1:
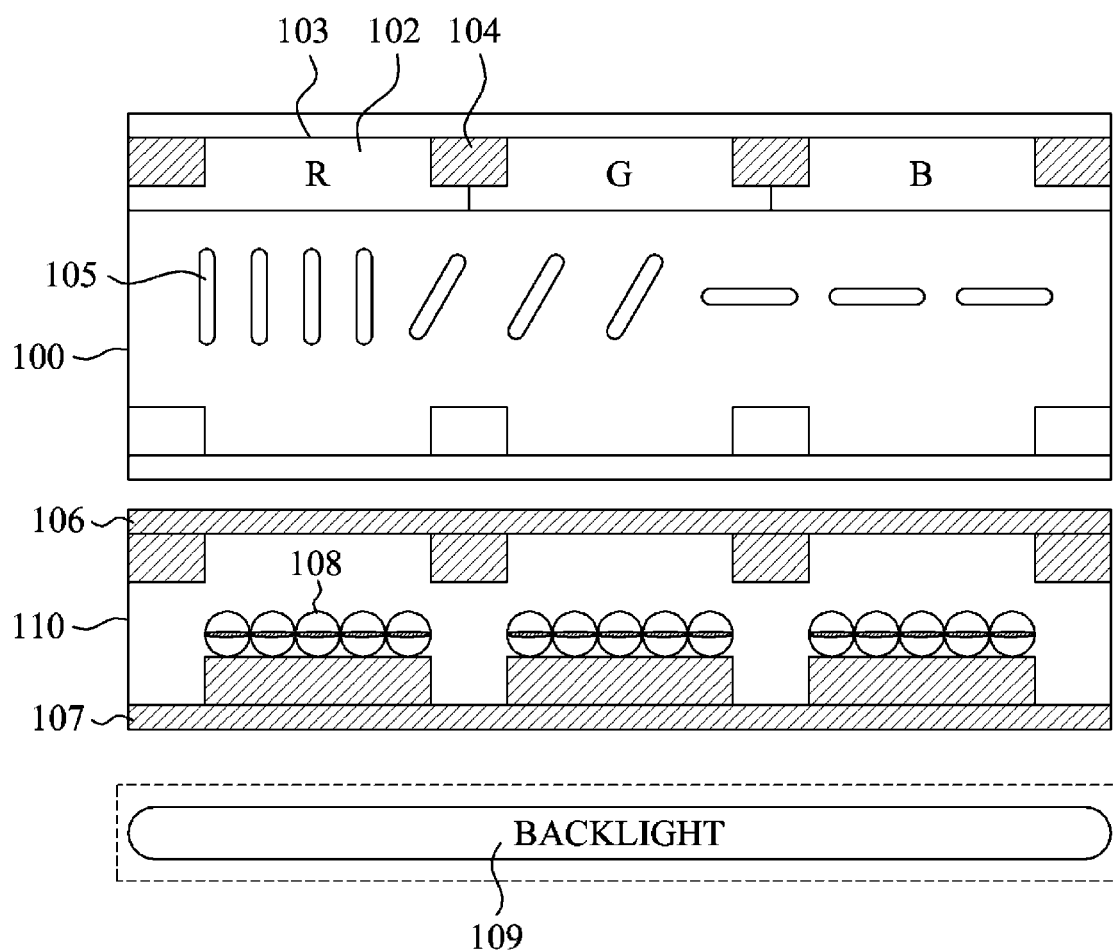
FIG. 1 is a diagram illustrating an example of a transmitting liquid crystal display (LCD) panel including a switching display according to an embodiment of the present invention.

Reference will now be made in detail to present embodiments of the present invention, examples of which are illustrated in the accompanying drawings, wherein like reference numerals refer to the like elements throughout. The exemplary embodiments are described below in order to explain the present invention by referring to the figures. A method of controlling a switching display according to an embodiment of the present invention can be performed by a system for controlling a switching display according to an embodiment of the present invention.

FIG. 1 is a diagram illustrating an example of a transmitting liquid crystal display (LCD) panel including a switching display according to an embodiment of the present invention.

Referring to FIG. 1, an LCD panel 100 can include a sub pixel 102, a black matrix 104, and a liquid crystal 105. Also, the LCD panel 100 can include a backlight 109 which emits a light. A configuration of the LCD panel 100 is not limited to the configuration illustrated in FIG. 1, and can vary.

As illustrated in FIG. 1, as an exemplary embodiment, a switching display 110 can be located between the LCD panel 100 and the backlight 109. The switching display 110 can include a first transparent electrode 106 on an upper side of the switching display 110 and a second transparent electrode 107 on a bottom side of the switching display 110. Each transparent electrode can include an indium tin oxide (ITO) electrode. However, an arrangement of the first transparent electrode 106 and the second transparent electrode 107 is not limited to the configuration illustrated in FIG. 1. Specifically, the first transparent electrode 106 and the second transparent electrode 107 in the LCD panel 100 can be arranged in units of a plurality of sub pixels, as opposed to units of a single sub pixel 102 as illustrated in FIG. 1.

Although a twist ball 108 is preferably located in the second transparent electrode 107, a location of the twist ball 108 is not limited to the location illustrated in FIG. 1. The twist ball 108 can include a reflector which reflects light and a transparent material with electric charge, which is described in detail with reference to FIG. 3.

The switching display 110 can be set as any one display mode of a transmitting mode, transflective mode, and reflective mode according to a condition of an external light. For example, an electric signal, inputted to the first transparent electrode 106 and the second transparent electrode 107, is controlled, and thus the twist ball 108 can rotate. Accordingly, a transmission of a backlight and a reflection of the external light are controlled through the rotation of the twist ball 108, and the switching display 110 can be converted to a set display mode.

As described above, the transparent material of the twist ball 108 has two electric charges. The transparent material includes two electric charges opposite to each other, and the reflector is located in a border separating the transparent material with two electric charges. For example, one side of the transparent material can be a positive electric charge, and the other side of the transparent material can be a negative electric charge.

The electric signal can be inputted to the first transparent electrode 106 and the second transparent electrode 107. The electric signal is inputted to each of the first transparent electrode 106 and the second transparent electrode 107, and thereby can generate and control an electric field depending on a strength and polarity of the electric signal. Specifically, the twist ball 108 can be rotated by the electric field generated through the controlled electric signal.

The display mode of the switching display 110 can be converted to the transmitting/transflective/reflective mode according to the rotation of the twist ball 108. When the display mode of the switching display 110 is the reflective mode, the external light reflected by the reflector of the twist ball 108 can function as a light source of the LCD panel 100.

When the display mode of the switching display 110 is the transflective mode, the external light reflected by the reflector of the twist ball 108 and light, emitted from the backlight 109 transmitting through the transparent material of the twist ball 108, can function as the light source of the LCD panel 100. Also, when the display mode of the switching display 110 is the transmitting mode, the light emitted from the backlight 109 transmitting through the transparent material of the twist ball 108 can function as the light source of the LCD panel 100.

Accordingly, the twist ball 108 included in the switching display 110 can be rotated by controlling the electric signal in the transparent electrode considering the display mode set according to a condition of the external light. A contrast of the LCD panel 100 can be maintained regardless of the condition of the external light by converting the display mode of the switching display 110 through the rotated twist ball 108.

A control operation of the switching display 110 is described in greater detail with reference to FIGS. 2 through 6.

Figure 2:
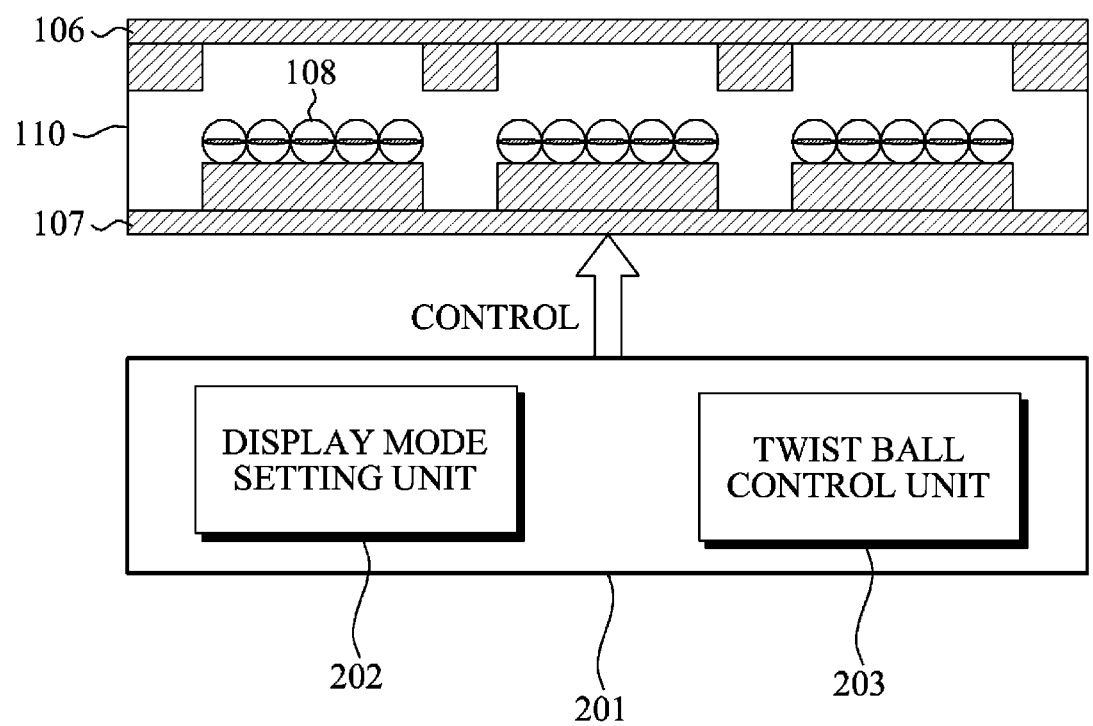
FIG. 2 is a block diagram illustrating a system for controlling a switching display according to an embodiment of the present invention.

FIG. 2 is a block diagram illustrating a system for controlling a switching display according to an embodiment of the present invention.

Referring to FIG. 2, the system for controlling a switching display 201 can include a display mode setting unit 202 and a twist ball control unit 203. FIG. 2 illustrates a switching display 110 and the system for controlling a switching display 201 which controls the switching display 110. The system for controlling a switching display 201 can embody a transmitting/transflective/reflective mode using a twist ball 108.

The display mode setting unit 202 can set a display mode of the switching display 110 according to a condition of an external light.

The display mode setting unit 202 can set the switching display as any one display mode of the transmitting mode, transflective mode, and reflective mode according to the condition of the external light. For example, the condition of the external light can include an intensity of the external light. As the intensity of the external light increases, a contrast of a LCD panel 100 is lower, and thus the LCD panel 100 can use a reflected light due to the external light. Conversely, as the intensity of the external light decreases, the LCD panel 100 can use a transmitted light emitted from a backlight 109. When the intensity of the external light is moderate, the LCD panel 100 can use the reflected light due to the external light and the transmitted light emitted from the backlight 109.

Accordingly, as the intensity of the external light increases, the display mode setting unit 202 can sequentially set the display mode of the switching display 110 as the transmitting mode, transflective mode, and reflective mode. The intensity of the external light to set each display mode can vary depending on a setting of the system for controlling a switching display 201.

The twist ball control unit 203 can control an electric signal of a first transparent electrode 106 and a second transparent electrode 107 of the switching display 110 according to the set display mode, and control a plurality of twist balls included in the switching display 110.

For example, when a display mode of the switching display 110 is set as the reflective mode, the twist ball control unit 203 can control the electric signal of the first transparent electrode 106 and the second transparent electrode 107 to enable a surface of a reflector to be parallel to a surface of the second transparent electrode 107. The reflector is included in the twist ball 108.

As an example, when the display mode of the switching display 110 is set as the transflective mode, the twist ball control unit 203 can control the electric signal of the first transparent electrode 106 and the second transparent electrode 107 to enable the surface of the reflector and the surface of the second transparent electrode 107 to be arranged with an arbitrary angle. The reflector is included in the twist ball 108.

As an example, when the display mode of the switching display 110 is set as the transmitting mode, the twist ball control unit 203 can control the electric signal of the first transparent electrode 106 and the second transparent electrode 107 to enable the surface of the reflector to be perpendicular to the surface of the second transparent electrode 107. The reflector is included in the twist ball 108.

An operation of controlling the switching display 110 according to each of the set display mode is described in detail with reference to FIGS. 4 through 6.

Figure 3:
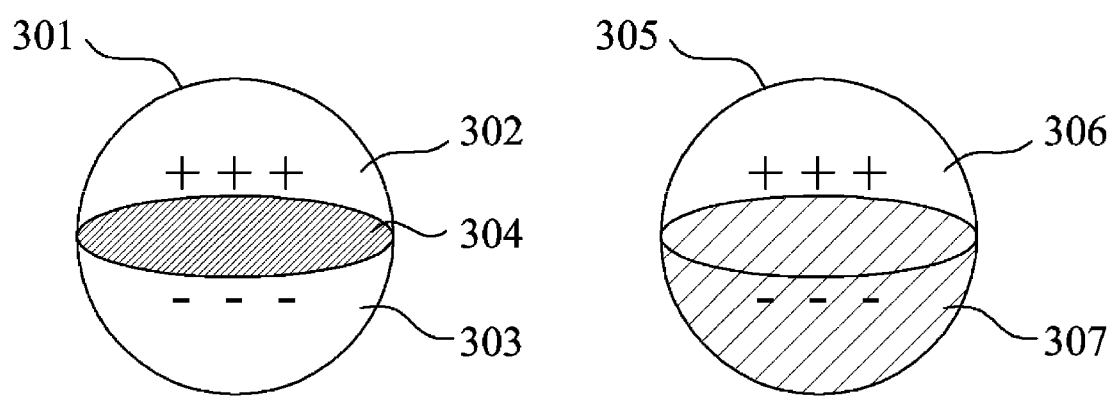
FIG. 3 is a diagram illustrating an example of twist balls according to an embodiment of the present invention.

FIG. 3 is a diagram illustrating an example of twist balls 301 and 305 according to an embodiment of the present invention.

For example, each of the first twist ball 301 and the second twist ball 305 can include a reflector which reflects light and a transparent material with electric charge. The reflector can include a material reflecting a visible light. The transparent material can include a material transmitting the visible light, not absorbing the visible light.

The twist balls can be configured in two ways. As illustrated in FIG. 3, for example, the first twist ball 301 can include transparent materials 302 and 303 with two electric charges opposite to each other. A reflector 304 can be located in a border separating the transparent materials 302 and 303 with two electric charges. The reflector 304 can be a thin circular plate.

For example, the first twist ball 301 can be manufactured by a spray Bolton scheme. According to the spray Bolton scheme, when the transparent materials 302 and 303 with two electric charges and the reflector 304 are rapidly rotated by applying pressure from three directions, the first twist ball 301 can be produced. However, a manufacturing method of the first twist ball 301 is not limited to the method described above.

As an example, the second twist ball 305 can include a transparent material 306 in one side and a reflector 307 in the other side. The transparent material 306 and the reflector 307 can have electric charges opposite to each other.

The first twist ball 301 and the second twist ball 305 can include the transparent materials 302, 303, and 306 having a same refractive index as a material included in the switching display 110. When the transparent materials 302, 303, and 306 have a refractive index different from the material included in the switching display 110, a visible light such as a reflected light or transmitted light can not be directly transmitted and is refracted. Accordingly, a brightness of a image can be deteriorated due to a black matrix of a LCD panel 100.

Also, the first twist ball 301 and the second twist ball 305 can include the transparent materials 302, 303, and 306 having a same specific gravity as the material included in the switching display 110. The twist ball 301 and 305 can be prevented from rapidly rotating due to the transparent materials 302, 303, and 306 have a same specific gravity as the material included in the switching display 110.

For example, when the switching display 110 uses the second twist ball 305, since a ratio of the reflector 307 is greater than the reflector 304 of the first twist ball 301, an amount of transmitted light when a display mode is a transmitting or reflective mode is smaller with the second twist ball 305. Accordingly, the brightness of the image decreases. Thus, when the switching display 110 uses the second twist ball 305, a refractive plate is attached to the transparent materials 302, 303, and 306 in order to refract a reflected light due to the reflector 307 again and increase the amount of the transmitted light.

Figure 4:
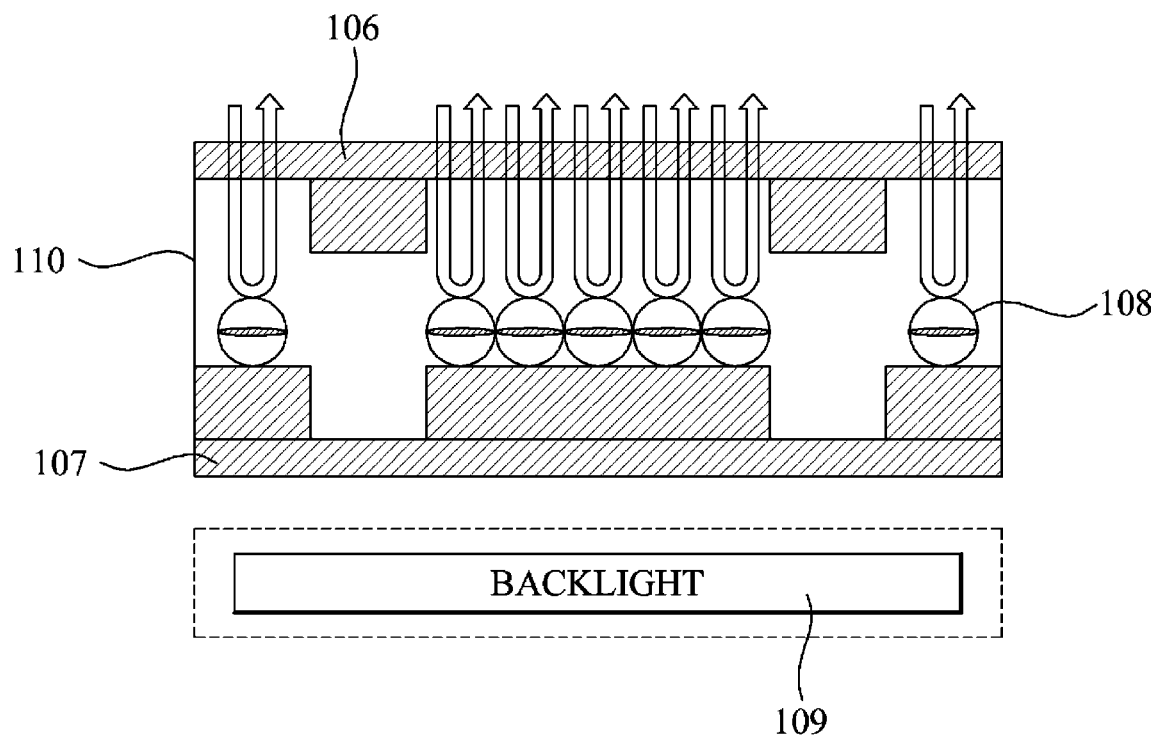
FIG. 4 is a diagram illustrating a configuration of a switching display of FIG. 1 set as a reflective mode.

FIG. 4 is a diagram illustrating a configuration of the switching display 110 of FIG. 1 set as a reflective mode.

Referring to FIG. 4, the twist ball 108 of the switching display 110 is the same as the first twist ball 301 described above with reference to FIG. 3. FIG. 4 illustrates that a display mode of the switching display 110 is set as a reflective mode according to a condition of an external light.

For example, when the switching display 110 is set as the reflective mode, the twist ball control unit 203 of FIG. 2 can control an electric signal of the first transparent electrode 106 and the second transparent electrode 107 to enable a surface of a reflector to be parallel to a surface of the second transparent electrode 107. The reflector is included in the twist ball 108, and a strength and polarity of the electric signal can also be controlled.

The first transparent electrode 106 and the second transparent electrode 107 can form an electric field depending on the electric signal. Accordingly, the twist ball 108 can rotate due to the electric field formed by the first transparent electrode 106 and the second transparent electrode 107.

When the surface of the reflector, included in the twist ball 108, is parallel to the surface of the second transparent electrode 107, the external light passes through a transparent material of the twist ball 108, is reflected by the reflector, and thereby can be reflected back through an LCD panel 100. That is, the surface of the reflector and the surface of the second transparent electrode 107 are parallel due to the rotation of the twist ball 108. Accordingly, the external light is reflected by the reflector of the twist ball 108, and the reflected external light can function as a light source of the LCD panel 100. When the switching display 110 is set as the reflective mode, light emitted from a backlight 109 due to the reflector included in the twist ball 108 is off.

Figure 5:
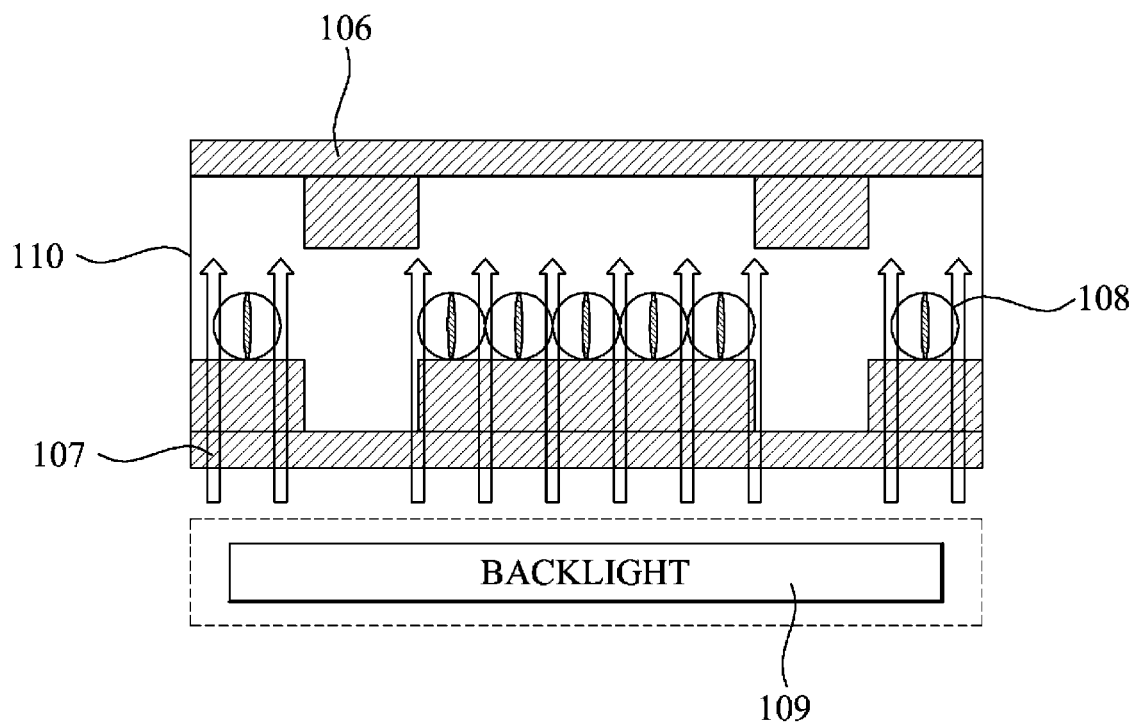
FIG. 5 is a diagram illustrating a configuration of a switching display of FIG. 1 set as a transmitting mode.

FIG. 5 is a diagram illustrating a configuration of the switching display 110 of FIG. 1 set as a transmitting mode.

Referring to FIG. 5, the twist ball 108 of the switching display 110 is the same as the first twist ball 301 described with reference to FIG. 3. FIG. 5 illustrates that the display mode of the switching display 110 is set as a transmitting mode according to a condition of external light.

For example, when the switching display 110 is set as the transmitting mode, the twist ball control unit 203 of FIG. 2 can control an electric signal of the first transparent electrode 106 and the second transparent electrode 107 to enable a surface of a reflector to be perpendicular to a surface of the second transparent electrode 107. The reflector is included in the twist ball 108, and a strength and polarity of the electric signal can also be controlled.

The first transparent electrode 106 and the second transparent electrode 107 can form an electric field depending on the electric signal. Accordingly, the twist ball 108 can rotate due to the electric field formed by the first transparent electrode 106 and the second transparent electrode 107.

When the switching display 110 is set as the transmitting mode, an intensity of the external light is insignificant. Accordingly, a LCD panel 100 can use light emitted from a backlight 109, separately installed, as a light source.

For example, when the surface of the reflector included in the twist ball 108 is perpendicular to the surface of the second transparent electrode 107, the light emitted from the backlight 109 can pass through a transparent material and the LCD panel 100. That is, the surface of the reflector and the surface of the second transparent electrode 107 meet at right angles due to the rotation of the twist ball 108. Accordingly, different from the reflective mode, the light emitted from the backlight 109 is insignificantly reflected by the reflector of the twist ball 108, and can pass through the transparent material. Thus, the light emitted from the backlight 109 is on.

As the reflector becomes thicker, an amount of light transmitting the transparent material becomes smaller. Accordingly, a thin reflector is preferable. However, as illustrated in FIG. 3, when the switching display 110 uses the second twist ball 305 where a half of the second twist ball 305 is filled with the reflector, an amount of the light emitted from the backlight 109 is small. In this case, light reflected by the reflector can be refracted again by attaching a refractive plate to the second transparent electrode 107. The light reflected by the reflector can pass through the LCD panel 100 by controlling a refraction angle of the refractive plate. Accordingly, when using the second twist ball 305, a same effect when using the first twist ball 301 can be generated by using the refractive plate.

Figure 6:
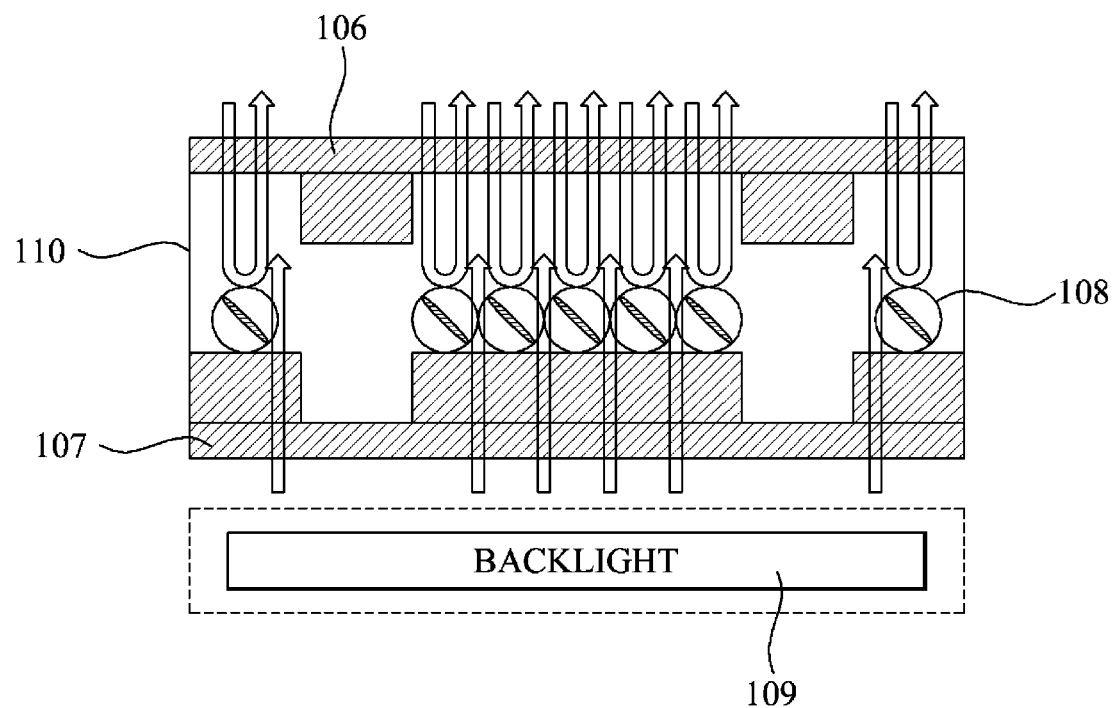
FIG. 6 is a diagram illustrating a configuration of a switching display of FIG. 1 set as a transflective mode.

FIG. 6 is a diagram illustrating a configuration of the switching display 110 of FIG. 1 set as a transflective mode.

Referring to FIG. 6, the twist ball 108 of the switching display 110 is the same as the first twist ball 301 described above with reference to FIG. 3. FIG. 6 illustrates that the display mode of the switching display 110 is a transflective mode according to a condition of external light.

For example, when the switching display 110 is set as the transflective mode, the twist ball control unit 203 of FIG. 2 can control an electric signal of the first transparent electrode 106 and the second transparent electrode 107 to enable a surface of a reflector and a surface of the second transparent electrode 107 to be arranged with an arbitrary angle. The reflector is included in the twist ball 108, and a strength and polarity of the electric signal can also be controlled.

The first transparent electrode 106 and the second transparent electrode 107 can form an electric field depending on the electric signal. Accordingly, the twist ball 108 can rotate due to the electric field formed by the first transparent electrode 106 and the second transparent electrode 107. A rotating angle can be controlled by the strength of the electric signal.

Referring to FIG. 6, the surface of the reflector included in the twist ball 108 can have the arbitrary angle with the surface of the second transparent electrode 107 through the controlled electric signal. In this case, the external light is reflected by the reflector of the twist ball 108, and light emitted from a backlight 109 can pass through a transparent material of the twist ball 108.

That is, when the switching display 110 is set as the transflective mode, light passing through an LCD panel 100 can include a reflected external light and the light emitted from the backlight 109. A ratio of the reflected external light and the light emitted from the backlight 109 can be controlled depending on an angle between the surface of the reflector included in the twist ball 108 and the surface of the second transparent electrode 107.

Specifically, as the angle is close to 0 degrees, a ratio of the reflected external light is greater. Also, as the angle is close to 90 degree, a ratio of the light emitted from the backlight 109 is greater. Also, as the angle is close to 180 degrees, a ratio of the reflected external light is greater. Accordingly, when the switching display 110 is set as the transflective mode, a ratio of the transmitted light and reflected light can be controlled depending on the angle between the reflector included in the twist ball 108 and the second transparent electrode 107. Thus, a contrast of the LCD panel 100 can be maintained.

Figure 7:
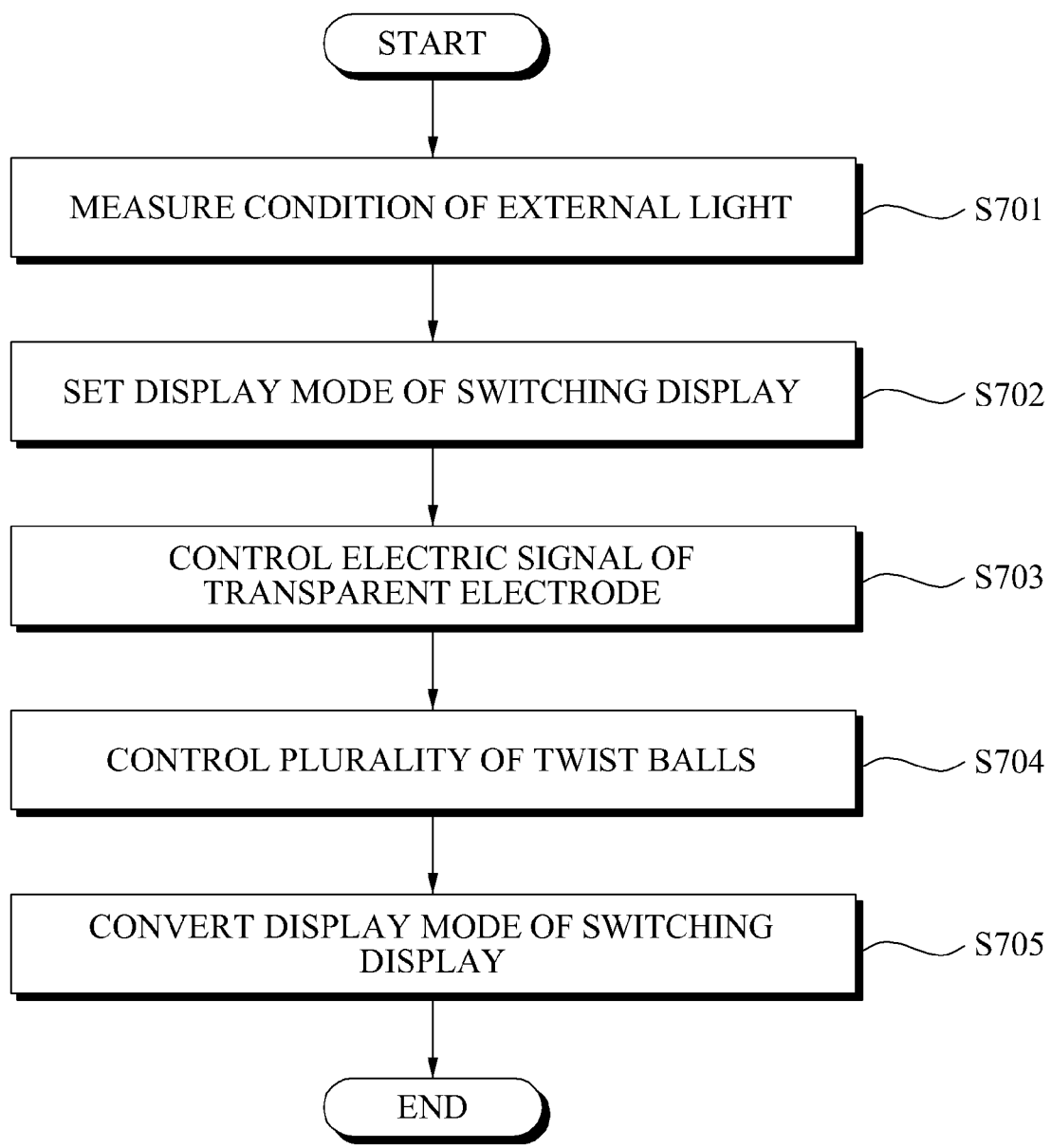
FIG. 7 is a flowchart illustrating a method of controlling a switching display according to an embodiment of the present invention.

FIG. 7 is a flowchart illustrating a method of controlling a switching display according to an embodiment of the present invention.

In operation S701, the method of controlling a switching display can measure a condition of an external light. The condition of the external light can indicate an intensity of the external light. The switching display can be set as any one of a transmitting mode, transflective mode, and reflective mode according to the condition of the external light.

In operation S702, the method of controlling a switching display can set a display mode of a switching display.

In operation S702, the switching display can be set as any one of the transmitting mode, transflective mode, and reflective mode according to the condition of the external light.

The switching display can control a transmission of a backlight and a reflection of the external light according to the set display mode using a plurality of twist balls.

The twist ball can include a reflector which reflects light and a transparent material with electric charge.

The twist ball can include the transparent material with two electric charges opposite to each other, and the reflector which is located in a border separating the transparent material with two electric charges.

The twist ball can include the transparent material located in one side, and the reflector located in the other side, and the transparent material and the reflector have electric charges opposite to each other.

The twist ball can include the transparent material having a same refractive index as a material included in the switching display.

In operation S703, the method of controlling a switching display can control an electric signal of a transparent electrode of the switching display according to the set display mode.

The electric signal of the transparent electrode can be controlled by a strength and polarity of the electric signal. The transparent electrode can form an electric field through the controlled electric signal.

In operation S704, the method of controlling a switching display controls the plurality of twist balls included in the switching display through the controlled electric signal of the transparent electrode.

In operation S704, when the display mode of the switching display is set as the reflective mode, the method of controlling a switching display can control the electric signal of the transparent electrode to enable a surface of a reflector to be parallel to a surface of the transparent electrode. The reflector is included in the twist ball.

In operation S704, when the display mode of the switching display is set as the transmitting mode, the method of controlling a switching display can control the electric signal of the transparent electrode to enable the surface of the reflector to be perpendicular to the surface of the transparent electrode. The reflector is included in the twist ball.

In operation S704, when the display mode of the switching display is set as the transflective mode, the method of controlling a switching display can control the electric signal of the transparent electrode to enable the surface of the reflector and the surface of the transparent electrode to be arranged with an arbitrary angle. The reflector is included in the twist ball.

In operation S705, the method of controlling a switching display converts the display mode of the switching display according to the controlled twist ball.

A description which has not been described with reference to FIG. 7 is omitted herein, since it is identical to the description described above with reference to FIGS. 1 through 6.

The above-described embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CDs and DVDs; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc., including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to aspects of the present invention, a system and method of controlling a switching display embodies a transmitting/transflective/reflective mode.

According to aspects of the present invention, a system and method of controlling a switching display converts a switching display mode using a twist ball, and thereby can regularly maintain a high contrast of an LCD panel regardless of an intensity of external light.

According to aspects of the present invention, a system and method of controlling a switching display controls an electrical signal of a transparent electrode according to a switching display mode which is set according to a condition of external light, and thereby can rotate a twist ball.

According to aspects of the present invention, a system and method of controlling a switching display converts a display mode of a switching display using a twist ball including a transparent material which transmits a visible light and a twist ball which reflects a visible light.

Although a few embodiments of the present invention have been shown and described, it would be appreciated by those skilled in the art that changes may be made to these embodiments without departing from the principles and spirit of the invention, the scope of which is defined by the claims and their equivalents.

What is claimed is:

1. A system for controlling a switching display which embodies a transmitting/transflective/reflective mode, the system comprising:

a display mode setting unit to set a display mode of a switching display according to a condition of an external light; and a twist ball control unit to control an electric signal of a transparent electrode of the switching display according to the set display mode, and to control a plurality of twist balls included in the switching display;

wherein the twist ball includes a transparent material with electric charge and an attached refractive plate located in one side, and a reflector which reflects light located in the other side, and the transparent material and the reflector have electric charges opposite to each other.

2. The system of claim 1, wherein the switching display controls a transmission of a backlight and a reflection of the external light according to the set display mode using the plurality of twist balls.

3. The system of claim 1, wherein the display mode setting unit sets the switching display as any one display mode of the transmitting mode, transflective mode, and reflective mode according to the condition of the external light.

4. The system of claim 1, wherein the twist ball includes the transparent material having a same refractive index as a material included in other elements of the switching display.

5. The system of claim 1, wherein, when the display mode of the switching display is set as the reflective mode, the twist ball control unit controls the electric signal of the transparent electrode to enable a surface of a reflector to be parallel to a surface of the transparent electrode, the reflector being included in the twist ball.

6. The system of claim 1, wherein, when the display mode of the switching display is set as the transmitting mode, the twist ball control unit controls the electric signal of the transparent electrode to enable a surface of a reflector to be perpendicular to a surface of the transparent electrode, the reflector being included in the twist ball.

7. The system of claim 1, wherein, when the display mode of the switching display is set as the transflective mode, the twist ball control unit controls the electric signal of the transparent electrode to enable a surface of a reflector and a surface of the transparent electrode to be arranged with an arbitrary angle, the reflector being included in the twist ball.

8. A method of controlling a switching display which embodies a transmitting/transflective/reflective mode, the method comprising:

setting a display mode of a switching display according to a condition of an external light;

controlling an electric signal of a transparent electrode of the switching display according to the set display mode; and controlling a plurality of twist balls included in the switching display through the controlled electric signal of the transparent electrode;

wherein the twist ball includes a transparent material with electric charge and an attached refractive plate located in one side, and a reflector which reflects light located in the other side, and the transparent material and the reflector have electric charges opposite to each other.

9. The method of claim 8, wherein the switching display controls a transmission of a backlight and a reflection of the external light according to the set display mode using the plurality of twist balls.

10. The method of claim 8, wherein the setting sets the switching display as any one display mode of the transmitting mode, transflective mode, and reflective mode according to the condition of the external light.

11. The method of claim 8, wherein the twist ball includes the transparent material having a same refractive index as a material included in other elements of the switching display.

12. The method of claim 8, wherein, when the display mode of the switching display is set as the reflective mode, the controlling of the plurality of twist balls controls the electric signal of the transparent electrode to enable a surface of a reflector to be parallel to a surface of the transparent electrode, the reflector being included in the twist ball.

13. The method of claim 8, wherein, when the display mode of the switching display is set as the transmitting mode, the controlling of the plurality of twist balls controls the electric signal of the transparent electrode to enable a surface of a reflector to be perpendicular to a surface of the transparent electrode, the reflector being included in the twist ball.

14. The method of claim 8, wherein, when the display mode of the switching display is set as the transflective mode, the controlling of the plurality of twist balls controls the electric signal of the transparent electrode to enable a surface of a reflector and a surface of the transparent electrode to be arranged with an arbitrary angle, the reflector being included in the twist ball.

15. A non-transitory computer-readable recording medium storing a program for implementing a method of controlling a switching display which embodies a transmitting/transflective/reflective mode, the method comprising:

setting a display mode of a switching display according to a condition of an external light;

controlling an electric signal of a transparent electrode of the switching display according to the set display mode; and controlling a plurality of twist balls included in the switching display through the controlled electric signal of the transparent electrode;

wherein the twist ball includes a transparent material with electric charge and an attached refractive plate located in one side, and a reflector which reflects light located in the other side, and the transparent material and the reflector have electric charges opposite to each other.

* * * * *